(12) United States Patent
Gummadi et al.

(10) Patent No.: US 11,895,701 B2
(45) Date of Patent: Feb. 6, 2024

(54) CHANNEL OCCUPANCY TIME (COT) IN MULTI-SUBSCRIBER IDENTITY MODULE DEVICES

(71) Applicant: QUALCOMM Incorporated, San Diego, CA (US)

(72) Inventors: Bapineedu Chowdary Gummadi, Hyderabad (IN); Pravjyot Singh Deogun, Bengaluru (IN); Hem Agnihotri, Benares (IN)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/302,547

(22) Filed: May 6, 2021

(65) Prior Publication Data
US 2022/0361240 A1    Nov. 10, 2022

(51) Int. Cl.
*H04W 16/14* (2009.01)
*H04W 74/08* (2009.01)
*H04W 88/06* (2009.01)

(52) U.S. Cl.
CPC ....... *H04W 74/0808* (2013.01); *H04W 16/14* (2013.01); *H04W 88/06* (2013.01)

(58) Field of Classification Search
CPC .. H04W 88/06; H04W 16/14; H04W 74/0808
See application file for complete search history.

(56) References Cited

U.S. PATENT DOCUMENTS

| | | | |
|---|---|---|---|
| 2012/0021755 A1* | 1/2012 | Chin | H04W 76/15 455/450 |
| 2012/0142348 A1* | 6/2012 | Park | H04W 52/0209 455/435.1 |
| 2019/0110307 A1* | 4/2019 | Kim | H04W 74/0808 |
| 2020/0383110 A1* | 12/2020 | Kusashima | H04L 5/0037 |
| 2022/0039153 A1* | 2/2022 | Zhuang | H04W 74/006 |
| 2022/0167407 A1* | 5/2022 | Oviedo | H04W 74/0808 |
| 2022/0295561 A1* | 9/2022 | Wang | H04W 74/0866 |
| 2022/0408461 A1* | 12/2022 | Lei | H04W 72/23 |

* cited by examiner

*Primary Examiner* — Dai Phuong
(74) *Attorney, Agent, or Firm* — Haynes and Boone, LLP

(57) ABSTRACT

Wireless communications systems and methods related to channel occupancy time (COT) sharing in multi-subscriber identity module (MultiSim) devices are provided. A user equipment (UE) transmits, based on a first subscriber identity during a first portion of a channel occupancy time (COT) in an unlicensed band, a first communication signal. The UE transmits, based on a second subscriber identity during a second portion of the COT, a second communication signal, the second subscriber identity being different from the first subscriber identity.

25 Claims, 7 Drawing Sheets

CHANNEL OCCUPANCY TIME (COT) IN MULTI-SUBSCRIBER IDENTITY MODULE DEVICES

TECHNICAL FIELD

This application relates to wireless communication systems, and more particularly to channel occupancy time (COT) sharing in multi-subscriber identity module (Multi-Sim) devices (e.g., user equipment (UE)).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

As use cases and diverse deployment scenarios continue to expand in wireless communication, spectrum sharing technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE), the method includes transmitting, based on a first subscriber identity during a first portion of a channel occupancy time (COT) in an unlicensed band, a first communication signal; and transmitting, based on a second subscriber identity during a second portion of the COT, a second communication signal, the second subscriber identity being different from the first subscriber identity.

In an additional aspect of the disclosure, a user equipment (UE) includes a transceiver configured to transmit, based on a first subscriber identity during a first portion of a channel occupancy time (COT) in an unlicensed band, a first communication signal; and transmit, based on a second subscriber identity during a second portion of the COT, a second communication signal, the second subscriber identity being different from the first subscriber identity.

In an additional aspect of the disclosure, a non-transitory computer-readable medium having program code recorded thereon for wireless communication by a user equipment (UE), the program code includes code for causing the UE to transmit, based on a first subscriber identity during a first portion of a channel occupancy time (COT) in an unlicensed band, a first communication signal; and code for causing the UE to transmit, based on a second subscriber identity during a second portion of the COT, a second communication signal, the second subscriber identity being different from the first subscriber identity.

In an additional aspect of the disclosure, a user equipment (UE) includes means for transmitting, based on a first subscriber identity during a first portion of a channel occupancy time (COT) in an unlicensed band, a first communication signal; and means for transmitting, based on a second subscriber identity during a second portion of the COT, a second communication signal, the second subscriber identity being different from the first subscriber identity.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
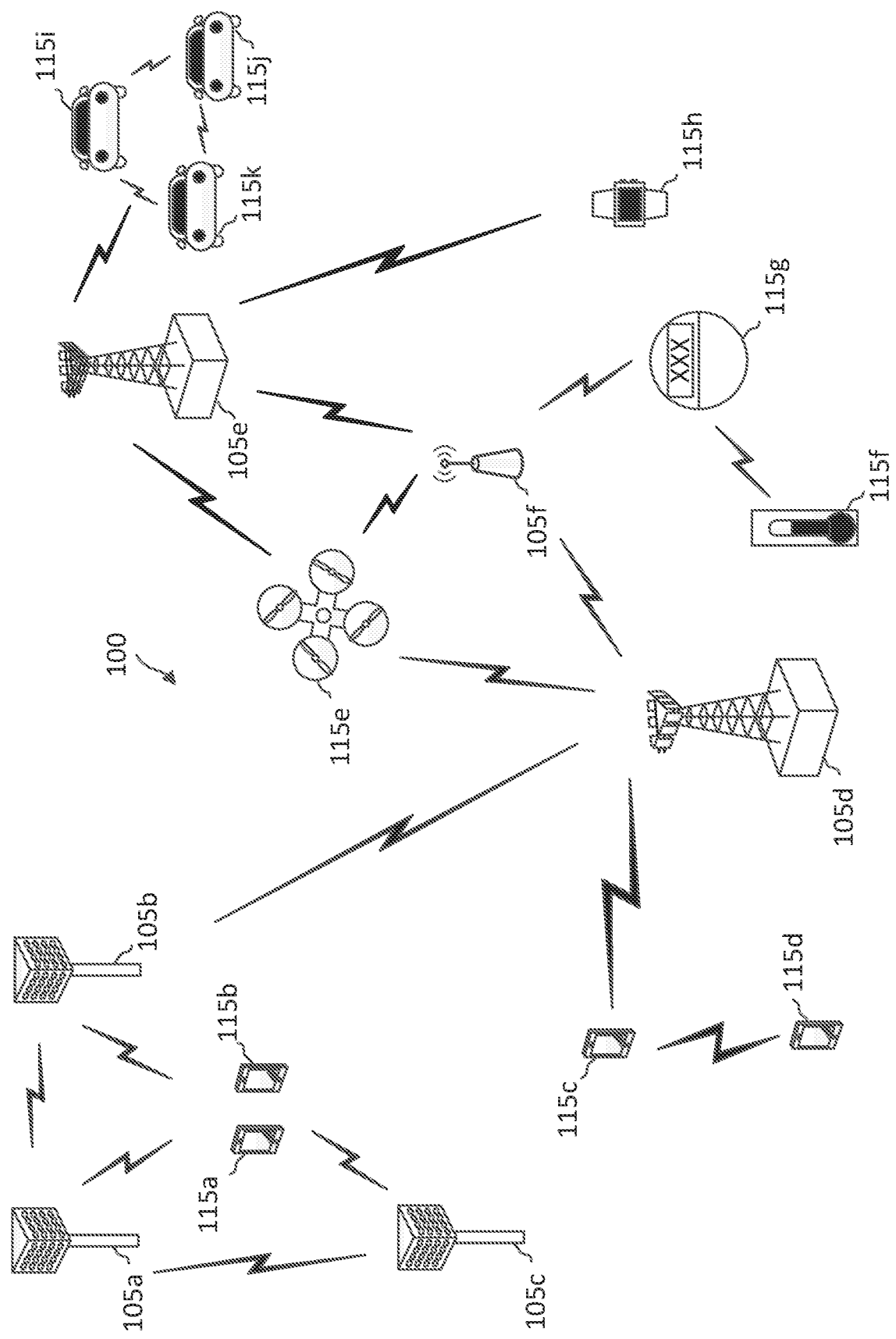
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including time-stringent control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

One approach to avoiding collisions when communicating in a shared spectrum or an unlicensed spectrum is to use a listen-before-talk (LBT) procedure to ensure that the shared channel is clear before transmitting a signal in the shared channel. During an LBT procedure, a device may perform a clear channel assessment (CCA) for a predetermined duration to contend for a channel occupancy time (COT). During the CCA, the device may compare the energy level detected in the channel to a threshold value. If the energy level exceeds the threshold, the device may determine that the channel is occupied, refrain from transmitting a signal in the channel, and repeat the CCA after a period of time, or the device may reduce its transmit power to avoid interfering with other devices that may be using the channel. If the energy level is below the threshold, the device may determine that the channel is unoccupied (indicating the device won the contention) and proceed with transmitting a signal in the COT.

In certain aspects, a wireless communication device or UE is a multiple SIM (MultiSim) device capable of utilizing multiple subscriptions for communication with one or more networks. For instance, the UE may include two SIMs, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

As explained above, when the UE operates over a shared channel (a radio frequency band) in a shared spectrum or unlicensed spectrum, the UE may perform an LBT prior to transmitting in the shared channel Since different subscriptions correspond to different network connections where communications are performed independently, the UE may also perform LBT separately for transmissions over different network connections. That is, if the UE has data associated with the first subscription for transmission, the UE may perform an LBT prior to the transmission for the first subscription. Similarly, if the UE has data associated with the second subscription for transmission, the UE may perform an LBT prior to the transmission for the second subscription. There is a resource utilization cost and overhead associated with each LBT. Additionally, there is a channel access uncertainty associated with each LBT due to the contention characteristic of LBT. Furthermore, transmissions on some unlicensed bands may be regulated by regulators. For instance, a regulator may regulate the duration of a COT acquired from an LBT. In an example, a regulator may mandate each COT to have a duration of about 5 milliseconds (ms) or 6 ms. Additionally, the duration of a COT can be dependent on the channel access priority class (CAPC) of a data signal for which the COT is contended for. However, in some scenarios, a UE may not utilize the entire duration of the COT for UL transmission, for example, if the UE does not have enough data for the first subscription or the second subscription. At the same time, the UE may have data to be transmitted for the other one of the first subscription or the second subscription. Further, in some cases, the data for the other one of the first subscription or the second subscription can have a higher priority than the subscription that initiated the COT. Accordingly, it may be inefficient for the UE to perform LBT separately for transmissions of different subscriptions.

The present disclosure describes mechanisms for COT sharing across different subscriptions at a MultiSim wireless communication device. For instance, a UE may include multiple SIMs each with a subscription to wireless services provided by an operator. In some aspects, the UE may have a first subscription on a first SIM and a second subscription on a second SIM. The first subscription may identify the UE by a first subscriber identity, and the second subscription may identify the UE by a second subscriber identity. The UE may transmit a first communication signal based on the first subscriber identity during a first portion of a COT. The UE may further transmit a second communication signal based on the second subscriber identity during a second portion of the COT. The second subscriber identity is different from the first subscriber identity. The UE may transmit the second communication signal using the second portion of the COT based on COT sharing information associated with sharing the second portion of the COT. For example, the second portion may be after the first portion.

In some aspects, the COT sharing information may include at least one of timing information (e.g., a COT start time, a COT end time, and/or a COT duration) associated with the COT or a channel access priority class (CAPC). A CAPC may specify a contention window size that a device may use for an LBT and/or a maximum channel occupancy duration that the device may contend for with the LBT. In some aspects, the COT sharing information may be communicated between the first SIM and the second SIM.

In some aspects, the COT may be initiated by a BS that serves the UE based on the first subscription or first subscriber identity. For example, the BS may perform an LBT to contend for the COT. The BS may transmit, and the UE may receive, an indication of the COT. In some instances, the COT indication may also indicate that the UE may share the COT for communications. In other aspects, the COT may be initiated by the UE for communication of the first subscription based on the first subscriber identity. For instance, the UE may perform an LBT to contend for the COT and transmit the first communication signal associated with the first subscription during the COT. The UE may determine to share the COT with transmissions associated with the second subscription. In some aspects, the UE may transmit the second communication signal during a slot in the second portion that is a common uplink (UL) slot for both the first subscription and the second subscription, for example, when the COT is initiated by the serving BS of the first subscription.

In some aspects, the UE may determine to share the COT for transmitting the second communication signal based on a channel access priority associated with the second communication signal. For instance, the second communication signal (transmitted based on the second subscriber identity) may be associated with a higher channel access priority than the first communication signal (transmitted based on the first subscriber identity).

In some aspects, the UE may determine to share the COT for transmitting the second communication signal based on a logical channel priority associated with the second communication signal. For instance, the second communication signal (transmitted based on the second subscriber identity) may be associated with a higher logical channel priority than the first communication signal (transmitted based on the first subscriber identity).

In some aspects, the UE may perform an LBT during the COT prior to transmitting the second communication signal, for example, when a gap between the first communication signal and the second communication signal or when the gap is longer than a certain threshold duration.

In some aspects, the UE may further share a third portion of the COT initiated for the first subscription with a serving BS of the second subscription, where the third portion may be after the second portion. For instance, the UE may transmit the second communication signal to the serving BS of the second subscription and may indicate COT sharing information associated with sharing the third portion in the second communication signal. Subsequently, the UE may receive a third communication signal from the serving BS of the second subscription during the third portion of the COT.

In some aspects, the UE may operate in a sleep mode associated with the second subscriber identity during the first portion while the first communication is being transmitted based on the first subscriber identity for the first subscription. For instance, the UE may refrain from monitoring for paging messages, refrain from waking up from a connected discontinuous reception (CDRX) cycle, refrain from performing a CCA, and/or any monitoring/reception operations in DL slot(s) associated with the second subscriber identity (or second subscription) within the first portion that collides with UL slot(s) associated with the first subscriber identity (or first subscription).

Aspects of the present disclosure can provide several benefits. For example, sharing a COT across different subscriptions at a wireless communication device can reduce the overhead of performing an LBT when the UE already has knowledge of the channel being idle based on one of the subscriptions. Accordingly, the present disclosure can improve channel access or spectral sharing performance and improve resource utilization efficiency. While the present disclosure is described in the context of a UE having two SIMs or two subscriptions, the present disclosure can be applied to a wireless communication device using any suitable number of subscriptions (e.g., about 3, 4 or more).

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support time-stringent communications with ultra-reliable and redundant links for time-stringent devices, such as the UE 115e. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

Figure 2A:
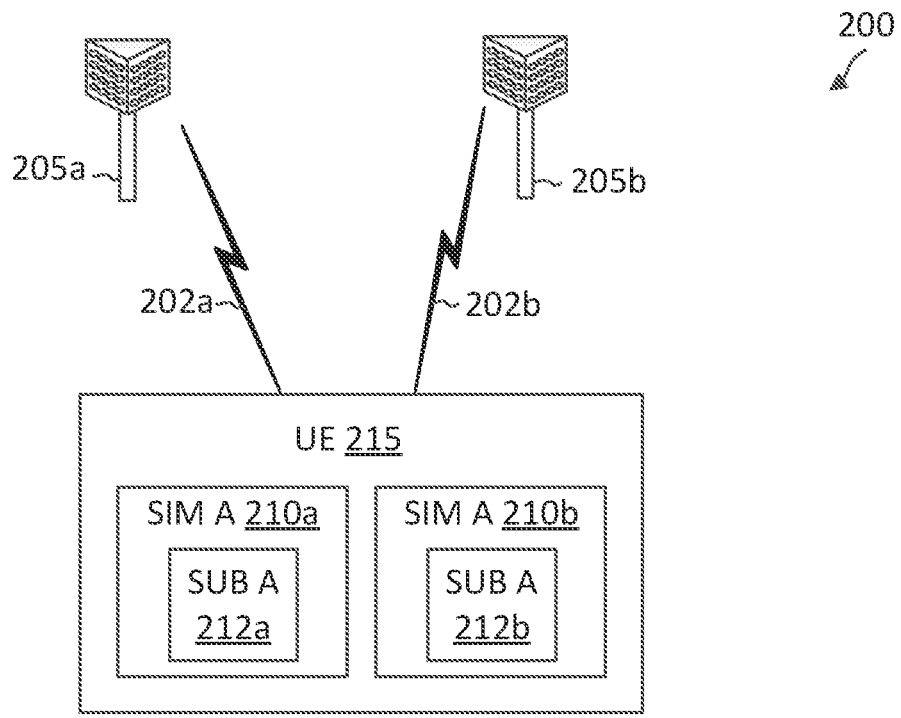
FIG. 2A illustrates a communication scenario utilizing multiple subscriptions according to some aspects of the present disclosure.
Figure 2B:
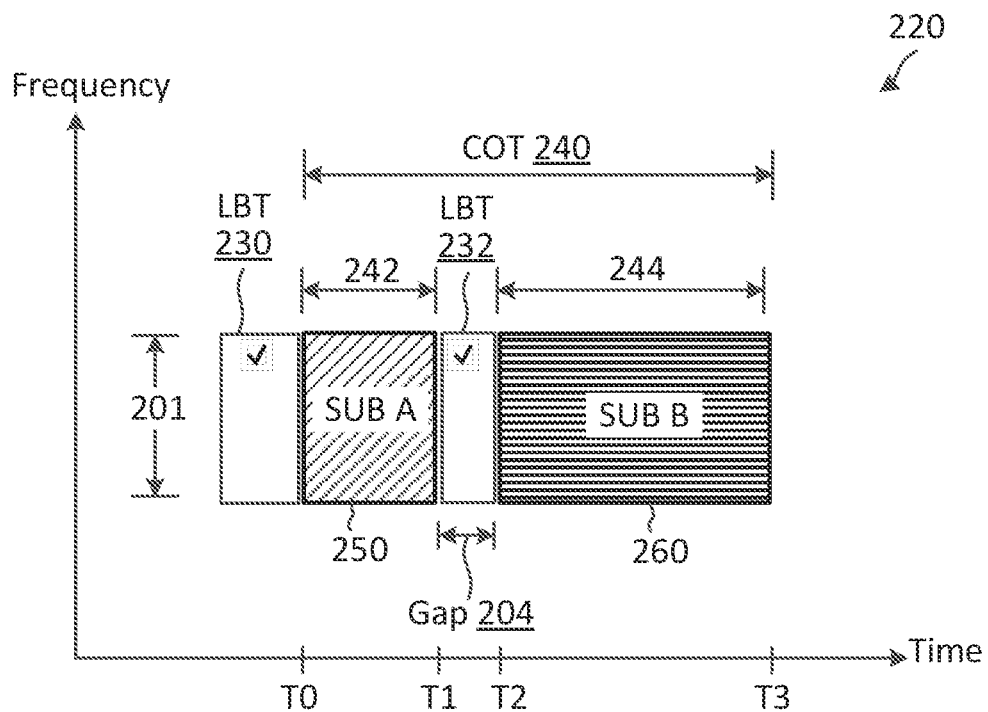
FIG. 2B illustrates a communication scenario utilizing multiple subscriptions according to some aspects of the present disclosure.

In some aspects, a UE 115 may be capable of utilizing multiple subscriber identity modules (SIMs) for communication with one or more networks. FIGS. 2A and 2B are discussed in relation to each other to illustrate a communication scenario for a MultiSim capable UE.

FIG. 2A illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205a and 205b) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs or SIM cards for communication with one or more networks. For simplicity, FIG. 2 illustrates the UE 215 including two SIMs 210 (shown as SIM A 210a and SIM B 210b), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210a and/or SIM B 210b may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212a (shown as SUB A) with the first operator and a second subscription 212b (shown as SUB B) with the second operator. Accordingly, the SIM A 210a may store or maintain information for accessing a network of the first operator based on the first subscription 212a, and the SIM B 210b may store information for access a network of the second operator based on the second subscription 212b. In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

Figure 6:
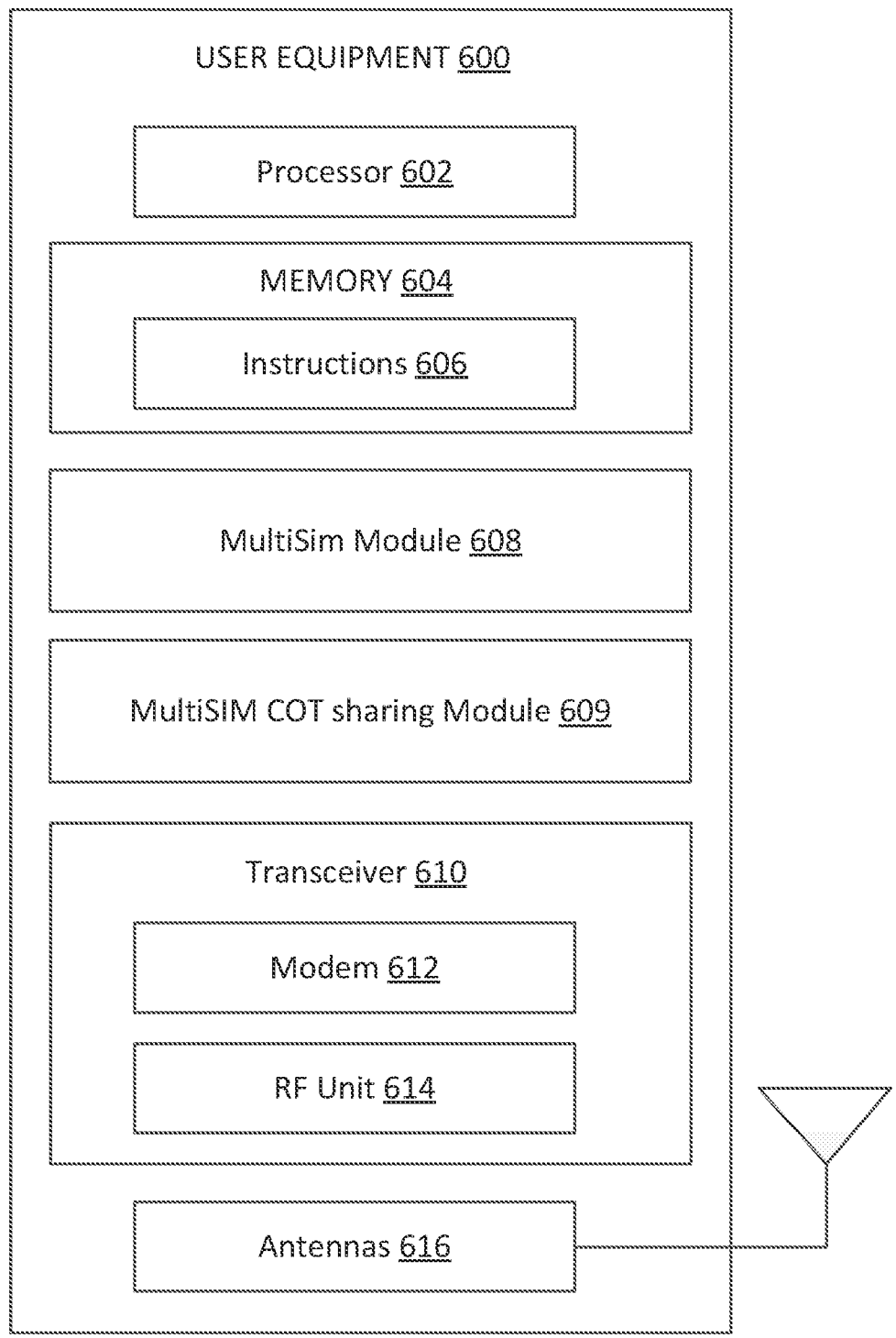
FIG. 6 illustrates a block diagram of a user equipment (UE) according to some aspects of the present disclosure.

In some aspects, the UE 215 may operate in a DSDS mode, where both SIMs 210a and 210b can be on standby (in an idle mode) waiting to begin communications. When a communication is established on one SIM (e.g., the SIM A 210a), the other SIM (e.g., the SIM B 210b) is no longer active. That is, one SIM may be active at a given time. For instance, both SIMs 210 may share a single transceiver and/or RF chain (e.g., a transceiver 610 and/or RF unit 614 as shown in FIG. 6) at the UE 215 for communications with corresponding network(s). In other aspects, the UE 215 may operate in a DSDA mode, where the UE 215 may simultaneously connect to the same network or different networks via the SIM A 210a and the SIM B 210b. That is, both SIM A 210a and SIM B 210b may have active communications at the same time. For instance, the UE 215 may have multiple transceiver and/or RF chains (e.g., a transceiver 610 and/or RF unit 614 as shown in FIG. 6), where each of the SIM A 210a and the SIM B 210b may utilize one of the transceiver and/or RF chains at the same time for concurrent communications.

In some aspects, the radio link 202a between the UE 215 and the BS 205a and the radio link 202b between the UE 215 and the BS 205b may be over an unlicensed band. Accordingly, each of the BS 205a, BS 205b, and/or the UE 215 may perform an LBT prior to a transmission and may proceed with the transmission upon a successful LBT (indicating the channel is cleared for transmission). In some aspects, the BS 205a may perform an LBT (e.g., a CAT4 LBT) to contend for a COT, which may be referred to as a master COT (MCOT), for a DL transmission to the UE 215. Upon winning the COT, the BS 205a may transmit a DL communication (e.g., including PDCCH downlink control information (DCI), PDSCH data, and/or DL reference signals) to the UE 215 during the COT. In some instances, the BS 205a may share the COT with the UE 215. For instance, the BS 205a may schedule the UE 215 to transmit an UL communication (e.g., including PUCCH uplink control information (UCI), PUSCH data, and/or UL reference signal(s)) during the COT. When the UE 215 transmits in the BS 205a's COT, the UE 215 may perform a CAT2 LBT or no LBT prior to the transmission, for example, depending on a transmission gap prior to the UL transmission. For example, if the gap is longer than about 16 μs, the UE 215 may perform a CAT2 LBT with a 1-shot LBT (one measurement) prior to the UL transmission. If the gap is shorter than 16 μs, the UE 215 may transmit without performing an LBT. In any case, by transmitting within the BS 205a's COT, the UE 215 can save LBT overhead.

In some aspects, the BS 205a may schedule the UE 215 to transmit outside of a MCOT of the BS 205a or may configure the UE 215 with a configured grant to transmit at some periodic time instances which may not be within a MCOT of the BS 205a. Accordingly, the UE 215 may perform an LBT (e.g., a CAT4 LBT) to contend for a COT for a UL transmission. Upon winning the COT, the UE 215 may transmit a scheduled or configured UL communication (e.g., including PUCCH UCI, PUSCH data, and/or UL reference signals) to the BS 205a during the COT. The UE 215 may share the COT with the BS 205a in a similar way as the BS 205a sharing a COT with the UE 215. For example, the BS 205a may utilize a remaining portion of the COT (after the UL transmission) to transmit a DL communication to the UE 215. For communication and/or COT sharing between the BS 205b and the UE 215, the BS 205b and the UE 215 may utilize substantially similar mechanisms as between the BS 205a and the UE 215.

As explained above, there is a cost or overhead in terms of resource utilization associated with each LBT. Additionally, there is a channel access uncertainty associated with each LBT due to the contention characteristic of LBT. Furthermore, transmissions on some unlicensed bands may be regulated by regulators. For instance, a regulator may regulate the duration of a COT acquired from an LBT. In an example, a regulator may mandate each COT to have a duration of about 5 ms or 6 ms. However, in some scenarios, the UE 215 may not utilize the entire duration of the COT for UL transmission, for example, if the UE 215 does not have enough data for the first subscription 212a or the second subscription 212b. At the same time, the UE 215 may have data to be transmitted for the other one of the first subscription 212a or the second subscription 212b. Further, in some cases, the data for the other one of the first subscription 212a or the second subscription 210b can have a higher priority than the subscription that initiated the COT. Accordingly, it may be inefficient to perform LBT separately for transmissions of the different subscriptions.

FIG. 2B illustrates a MultiSim-based communication scenario 220 according to some aspects of the present disclosure. FIG. 2B is discussed in relation to FIG. 2A, where the UE 215 communicates with the BS 205a via the SIM A 210a and with the BS 205b via the SIM B 210b. FIG. 2B further illustrates COT sharing across different subscriptions or different SIMs. In FIG. 2B, the x-axis represents time in some arbitrary units, and the y-axis represents frequency in some arbitrary units.

In the scenario 220, the UE 215 may contend for a COT 240 in a frequency band 201, which may be a shared radio frequency band and/or an unlicensed band, for transmission to the BS 205a using the first subscription 212a (e.g., SUB A). To transmit an UL communication signal over the frequency band 201, the UE 215 may perform an LBT 230 to contend for the COT 240 in the frequency band 201. In an example, the UE 215 may perform a CAT4 LBT 230 to contend for the COT 240. If the LBT 230 fails (e.g., detecting an energy measurement in the channel exceeding an energy detection threshold), the UE 215 may refrain from transmitting in the frequency band 201. However, if the LBT 230 is successful (e.g., energy measured from the channel is below the energy detection threshold), the UE 215 may proceed to use the COT 240 for UL communication. In the illustrated example of FIG. 2B, the LBT 230 is successful as shown by the checkmark. Thus, the UE 215 may communicate a first UL communication signal 250 (labeled with SUB A) with the BS 205a based on the first subscription 212a SUB A, via the SIM A 210a, in the frequency band 201 during the COT 240. The first UL communication signal 250 may include PUCCH UCI, PUSCH data, and/or UL reference signal(s). The UE 215 may have established a first connection (e.g., a radio resource control (RRC) connection) with the BS 205a using a first subscriber identity (stored at the SIM A 210a) associated with the first operator (e.g., the BS 205a), and thus the first UL communication signal 250 may be communicated using the first connection. In some aspects, the first subscriber identity may be an IMSI that identifies a user in a cellular network (e.g., a 5G or LTE network) that interconnects with other networks (e.g., IP networks). In some examples, an IMSI may include a mobile country code (MCC), a mobile network code (MNC), and a mobile subscription identification number (MSIN).

In some aspects, the UE 215 may have acquired a COT 240 with a duration (e.g., from time T0 to time T3) longer than a duration for transmitting the first UL communication signal 250. Thus, there may be unused time resources in the COT 240. As shown in FIG. 2B, the first UL communication signal 250 for the first subscription 212a SUB A occupies a first portion 242 (from time T0 to time T1) of the COT 240 less than the entire duration of the COT 240. Accordingly, the UE 215 may determine to share the COT 240 for communication associated with the SIM B 210b since the UE 215 have knowledge that the channel is idle and available for access during the COT 240.

In some aspects, the SIM A 210a and the SIM B 210b may exchange COT sharing information for sharing the COT 240. For instance, the SIM A 210a may provide the SIM B 210b with information such as at a starting time (e.g., time T0), an ending time (e.g., time T3), and/or a duration of the COT 240. As an example, the UE 215 may have established a connection (e.g., an RRC connection) using a second subscriber identity (stored at the SIM B 210b) with the second operator (e.g., the BS 205b) and may have data associated with the second subscription 212b SUB B for transmission to the BS 205b. The second subscriber identity may be an IMSI and may have at least a different MSIN than the first subscriber identity. As shown, the UE 215 may utilize a second portion 244 (a remaining portion after the portion 242) of the COT 240 to transmit a second UL communication signal 260 (labeled with SUB B) based on the second subscription 212b SUB B, via the SIM B 210b to the BS 205b. Similarly, the UL communication 260 may include PUCCH UCI, PUSCH data, and/or UL reference signal(s). Although FIG. 2 illustrates the second UL communication signal 260 occupying the entire portion 244, it should be understood that in other examples the UE 215 may not utilize the entire portion 244 (remaining portion of the COT) for transmitting the second UL communication signal 260.

Depending on the gap 204 between the first UL communication signal 250 and the second UL communication signal 260, the UE 215 may or may not perform an LBT prior to transmitting the second UL communication signal 260 when sharing the COT 240. For instance, when the gap 204 is longer than a certain threshold (e.g., about 16 µs), the UE 215 may perform an LBT 232 (e.g., a CAT2 LBT with 1-shot measurement). In the illustrated example of FIG. 2, the LBT 232 is successful as shown by the checkmark. Thus, the UE 215 may transmit the second UL communication 260 during the second portion 244 of the COT 240. In other instances, the UE 215 may transmit the second UL communication signal 260 immediately after the first UL communication signal 250 without a gap or with a short gap (e.g., less than or equal to 16 µs), and thus may not perform an LBT prior to transmitting the second UL communication signal 260.

In general, the UE 215 may transmit a first communication signal using a first subscriber identity during a COT in an unlicensed band and may transmit a second communication signal using a second subscriber identity during the same COT based on COT sharing cross multiple SIMs (e.g., the SIM A 210a and the SIM B 210b). In some aspects, the COT can be initiated by a BS 205a associated with the first subscription 212a SUB A as will be discussed in greater detail below with reference to FIG. 3. In other aspects, the COT can be initiated by the UE 215 similar to the scenario 220 and will be discussed in greater detail below with reference to FIG. 4.

Figure 3:
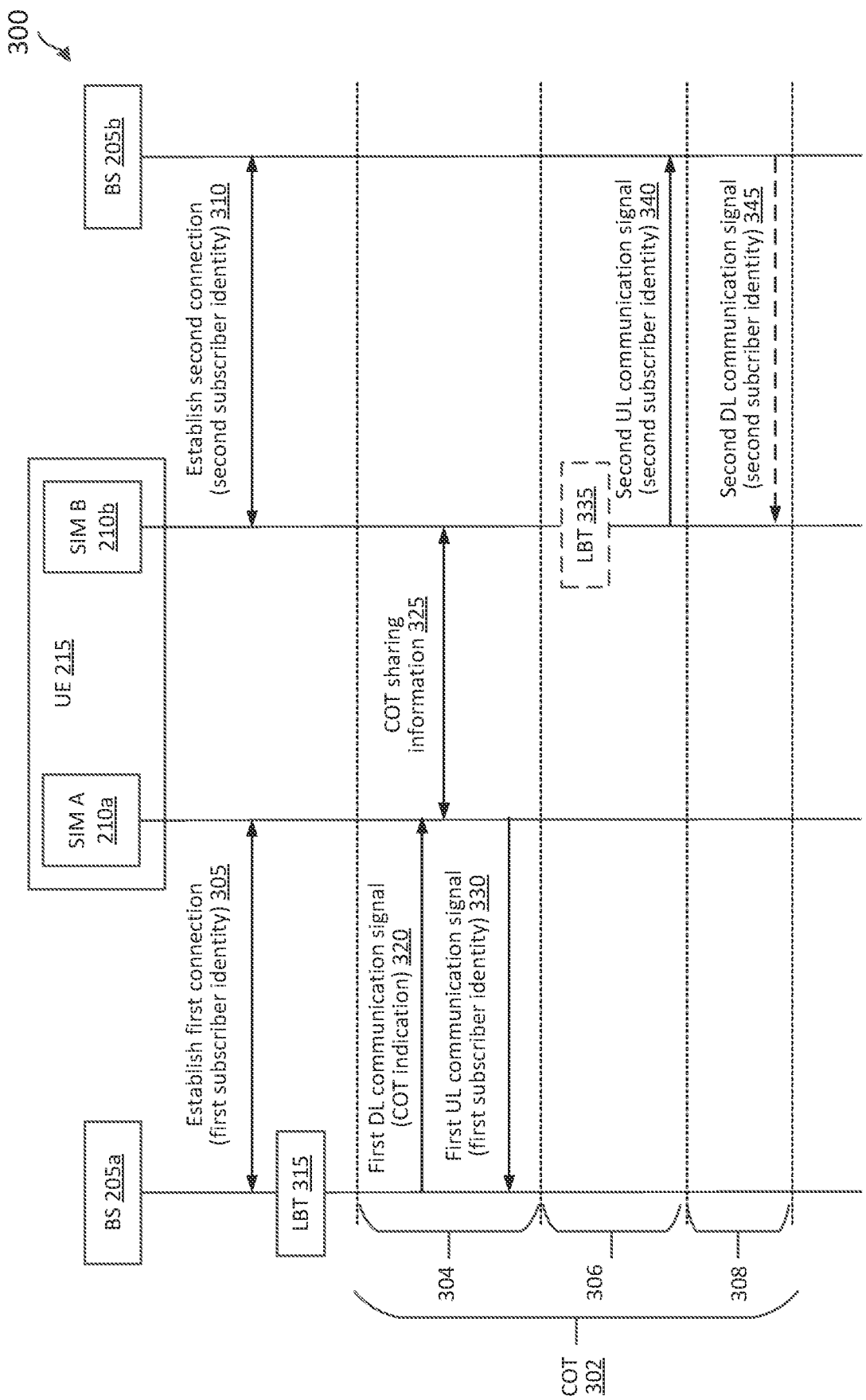
FIG. 3 a sequence diagram of a communication method utilizing multiple subscriptions according to some aspects of the present disclosure.

FIG. 3 is a sequence diagram of a communication method 300 that utilizes multiple subscriptions according to some aspects of the present disclosure. The method 300 may be implemented between a MultiSim UE (e.g., the UEs 115 and/or 215) and one or more corresponding BSs (e.g., the BSs 105 and/or 205). For example, the method 300 is implemented by the UE 215 (having a SIM A 210a and a SIM B 210b) and the BSs 205a and 205b of FIG. 2A. The method 300 may employ similar mechanisms as discussed above in relation to FIGS. 1 and 2A-2B. In some aspects, the UE 215 may utilize one or more components, such as the processor 602, the memory 604, the MultiSim module 608, the MultiSim COT sharing module 609, the transceiver 610, the modem 612, and the one or more antennas 616 of FIG. 6, to execute the steps of method 300. In some aspects, each of the BS 205a, 205b may utilize one or more components, such as the processor 502, the memory 504, the communication module 508, the transceiver 510, the modem 512, and the one or more antennas 516 of FIG. 5, to execute the steps of method 300. As illustrated, the method 300 includes a number of enumerated actions, but aspects of the method 300 may include additional actions before, after, and in between the enumerated actions. In some aspects, one or more of the enumerated actions may be omitted or performed in a different order.

In the method 300, the UE 215 may have a first subscription for wireless services from a first operator (e.g., operating the BS 205a) and a second subscription for wireless services from a second operator (e.g., operating the BS 205b). In some instances, the first operator and second operator may correspond to the same operator. In other instances, the first operator is different from the second operator. In some aspects, the first operator may assign the UE 215 with a first subscriber identity (e.g., IMSI) for communication using the first subscription, and the second operator may assign the UE 215 with a second subscriber identity (e.g., IMSI) for communication using the second subscription. The first subscriber identity and the second subscriber identity may be different, each uniquely identifying the UE 215 in a first network of the first operator and in a second network of the second operator, respectively. In some aspects, the UE 215 may communicate with the first network via the SIM A 210a for the first subscription using the first subscriber identity, and may communicate with the second network via the SIM B 210b for the second subscription using the second subscriber identity. In some aspects, the SIM A 210a may include a SIM card storing the first subscriber identity and/or any associated information or key(s) for authorizing and/or authenticating the UE 215a in the first network, and the SIM B 210a may include a SIM card storing the second subscriber identity and/or any associated information or key(s) for authorizing and/or authenticating the UE 215a in the second network.

At action 305, the UE 215 establishes a first connection via the SIM A 210a with the BS 205a using the first subscriber identity. For example, the UE 215 may perform a random access procedure via the SIM A 210a to establish an RRC connection with the BS 205a, which may include the exchange of MSG1, MSG2, MSG3, and MSG4, as discussed above with reference to FIG. 1. Upon establishing the RRC connection, the UE 215 may perform a network attachment procedure via the SIM A 210a with the BS 205a. The network attachment procedure may include various operations such as identifying, authorizing, and/or authenticating the UE 215 as discussed above with reference to FIG. 1, based on the first subscriber identity of the UE 215. After successfully completing the network attachment, the UE 215 may communicate with the BS 205a over the first connection (based on the first subscriber identity).

Similarly, at action 310, the UE 215 establishes a second connection via the SIM B 210b with the BS 205b using the second subscriber identity. The UE 215 may establish the second connection with the BS 205b using similar mechanisms as for the first connection with the BS 205a. For example, the UE 215 may perform a random access procedure via the SIM B 210b to establish an RRC connection with the BS 205b, which may include the exchange of MSG1, MSG2, MSG3, and MSG4, as discussed above with reference to FIG. 1. Upon establishing the RRC connection, the UE 215 may perform a network attachment procedure with the second network via the SIM B 210b with the BS 205b. The network attachment procedure may include various operations such as identifying, authorizing, and/or authenticating the UE 215 as discussed above with reference to FIG. 1, based on the second subscriber identity of the UE 215. After successfully completing the network attachment, the UE 215 may communicate with the BS 205b over the second connection (based on the second subscriber identity).

As explained above, in some aspects, the UE 215 may use the same radio access technology (e.g., NR or NR-U) for communication via the SIM A 210a with the BS 205a and via the SIM B 210b the BS 205b. In other aspects, the UE 215 may use one radio access technology (e.g., NR or NR-U) for communication via the SIM A 210a with the BS 205a and another radio access technology (e.g., LTE) for communication via the SIM B 210b with the BS 205b. Further, while FIG. 3 illustrates the BS 205a and BS 205b as separate BSs, in some aspects, the BS 205a and the BS 205 may correspond to the same BS. That is, UE 215 may communicate with the same BS using the SIM A 210a based on the first subscriber identity and using the SIM B 210b based on the second subscriber identity.

The UE 215 may communicate with the BS 205a and BS 205b over an unlicensed band (e.g., the frequency band 201). In some aspects, the BS 205a may desire to communicate a DL communication with the UE 215. Thus, at action 315, the BS 205a performs an LBT (e.g., a CAT4 LBT) to contend for a COT 302 in the unlicensed band. The LBT may be successful indicating the channel is clear for transmission. As shown, at action 320, the BS 205a transmits, and the UE 215 receives, a first DL communication signal. The first DL communication signal may include a PDCCH DCI (including a DL grant and/or a UL grant for the UE 215), PDSCH data, and/or DL reference signal(s). In some aspects, the BS 205a may also include a COT indication in the first DL communication signal. The COT indication may indicate to the UE 215 that the BS 205a had acquired the COT 302. In some aspects, the COT indication may include timing information associated with the COT 302, for example, a COT start time, a duration, and/or a COT end time of the COT 302. In some aspects, the COT indication may also include COT sharing information, for example, indicating whether the UE 215 may share the COT 302. For instance, the COT indication indicates that the UE 215 may share the COT 302 of the BS 205a for transmission.

In an aspect, the first DL communication signal communicated at action 320 may include a UL scheduling grant for the UE 215 to transmit within the COT 302. Accordingly, at action 330, the UE 215 transmits via the SIM A 210a, and the BS 205a receives, a first UL communication signal based on the UL scheduling grant. The UE 215 may transmit the first UL communication signal over the first connection (established between the SIM A 210a and the BS 205a at action 305 using the first subscriber identity). The first UL communication signal may include PUCCH UCI, PUSCH data, and/or UL reference signal(s) associated with the first subscriber identity.

In an aspect, the communication of the first DL communication signal and the first UL communication signal associated with the SIM A 210a using the first subscriber identity may not utilize an entire duration of the COT 302. In the illustrated example of FIG. 3, the communication of the first DL communication signal and the first UL communication signal (based on the first subscriber identity) is within a first portion 304 of the COT 302. Since the UE 215 has knowledge that the channel is idle based on the COT indication, the UE 215 may determine to allow COT sharing between the SIM A 210a and the SIM B 210b. Thus, at action 325, the SIM A 210a and the SIM B 210b exchanges COT sharing information. For instance, the SIM A 210a may provide information for sharing a remaining portion (e.g., a second portion and a third portion 308) of the COT 302. In some instances, the information may include a COT start time, a duration, and/or a COT end time of the COT 302. Additionally or alternatively, the information may include a start time of the remaining portion where the SIM B 210b may start sharing the COT 302. Additionally or alternatively, the information may indicate that the SIM B 210b may share the remaining portion of the COT 302 for transmission based on a certain channel access priority class (CAPC). As explained above, when the SIM B 210b shares a COT for transmission, the SIM B 210b may perform an LBT prior to the transmission where there is a long gap (e.g., longer than 16 μs) prior to the transmission. Different CAPCs may allow for different COT durations and/or specify different contention window sizes (CWSs) for performing an LBT. For example, the shorter the CWS, the higher the channel access priority. Additionally or alternatively, the information may indicate that the SIM B 210b may share the remaining portion of the COT 302 for transmission if the SIM B 210b has data of a higher traffic or data priority (e.g., a logical channel priority) than the data carried by the first UL communication signal.

In an aspect, the UE 215 may have data associated with the second subscriber identity ready for transmission to the BS 205b. Thus, at action 340, the UE 215 transmits via the SIM B 210b, and the BS 205b receives, a second UL communication signal during the shared second portion 306. The UE 215 may transmit the second UL communication signal over the second connection (established between the SIM B 210b and the BS 205b at action 310 using the second subscriber identity). The second UL communication signal may include PUCCH UCI, PUSCH data, and/or UL reference signal(s) associated with the second subscriber identity.

Since the COT 302 is acquired by the BS 205a, the UE 215 may select a slot in the second portion 306 that is a common UL slot for the SIM A 210a (using the first subscriber identity) and the SIM B 210b (using the second subscriber identity). To that end, the UE 215 may communicate with the BS 205a based on the first subscription or first subscriber identity according to a first TDD pattern including one or more UL slots and/or one or more DL slots. Similarly, the UE 215 may communicate with the BS 205b based on the second subscription or second subscriber identity according to a second TDD pattern including one or more UL slots and/or one or more DL slots. When the UE 215 utilizes the second portion 306 to transmit the second UL communication signal, the UE 215 may select a slot in the second portion 306 that is a UL slot in the second TDD pattern and a UL slot in the first TDD pattern for the transmission.

In some aspects, the UE 215 may determine to utilize the COT 302 to transmit the second UL communication signal associated with the second subscriber identity based on a priority associated with the second UL communication signal. For instance, in a first scenario, the UE 215 may determine to utilize the COT 302 to transmit the second UL communication signal based on the second subscriber identity when there is a high priority call (e.g., a voice call, IP multimedia subsystem (IMS) signaling, registration related signals, etc.) for the second subscription.

In a second scenario, the UE 215 may determine to utilize the COT 302 to transmit the second UL communication signal based on a channel access priority associated with the second UL communication signal. For example, the UE 215 may determine to utilize the COT 302 to transmit the second UL communication signal when the data in the second UL communication signal associated with the second subscriber identity has the same channel access priority (e.g., a CAPC) or a higher channel access priority than the data in the first UL communication signal associated with the first subscriber identity.

In a third scenario, the UE 215 may determine to utilize the COT 302 to transmit the second UL communication signal based on a logical channel priority associated with the second UL communication signal. In the context of 5G, logical channel types may include Broadcast Control Channel (BCCH), Paging Control Channel (PCCH), Common Control Channel (CCCH), Dedicated Control Channel (DCCH), Multi-cast Control Channel (MCCH), Dedicated Traffic Channel (DTCH), and Multicast Traffic Channel (MTCH). Different logical channels may have different priorities. In an example, the UE 215 may determine to utilize the COT 302 to transmit the second UL communication signal when the data in the second UL communication signal associated with the second subscriber identity has a higher logical channel priority than the data in the first UL communication signal associated with the first subscriber identity. In these scenarios, the UE 215 may operate in a DSDA mode, but may not transmit any data associated with the SIM A 210a (using the first subscriber identity) while SIM B 210b is transmitting data in the second portion 306 of the COT 302 since the channel is occupied by the SIM B 210b.

Depending on a gap between the first UL communication signal associated with the first subscriber identity and the second UL communication signal associated with the second subscriber identity, the UE 215 may perform an LBT prior to transmitting the second UL communication signal. As shown, at action 335, the UE 215 may perform an LBT (e.g., a CAT2 LBT or based on the CAPC exchanged at action 325) prior to transmitting the second UL communication signal. If the LBT is successful (indicating the channel is clear for transmission), the UE 215 may proceed to the transmit the second UL communication signal via the SIM B 210b during the portion 304 of the COT as shown. Otherwise, the UE 215 may refrain from transmitting in the portion 304. In other instances, the UE 215 may skip performing an LBT at action 335 prior to transmitting the second UL communication signal at action 340, for example, when the transmission gap prior to the second UL communication signal is short (e.g., less than or equal to 16 μs).

In an aspect, the SIM B 210*b* may not utilize the entire remaining portion of the COT 302 after the first portion 304. As shown, there is a third portion 308 remaining in the COT 302 after the second UL communication signal. The SIM B 210*b* may determine to share the remaining third portion 308 of the COT 302 with its serving BS 205*b*. For instance, the SIM B 210*b* may include information for sharing the third portion 308 of the COT 302 in the second UL communication signal transmitted at action 340. Accordingly, at action 345, the BS 205*b* transmits, and the UE 215 receives, via the SIM B 210*b*, a second DL communication signal over the second connection based on the second subscriber identity. The second DL communication signal may include PDCCH DCI, PDSCH data, and/or DL reference signal(s).

Although FIG. 3 illustrates one UL transmission from the SIM B 210*b* (to the BS 205*b*) in the second portion 306 of the COT 302 and one DL transmission from the BS 205*b* (to the UE 215) in the third portion 308 of the COT 302, it should be understood that the SIM B 210*b* and the BS 205*b* may communicate any suitable number of UL and/or DL communication signals with each other in a shared portion of a COT (acquired by the BS 205*b* associated with the first subscription).

Figure 4:
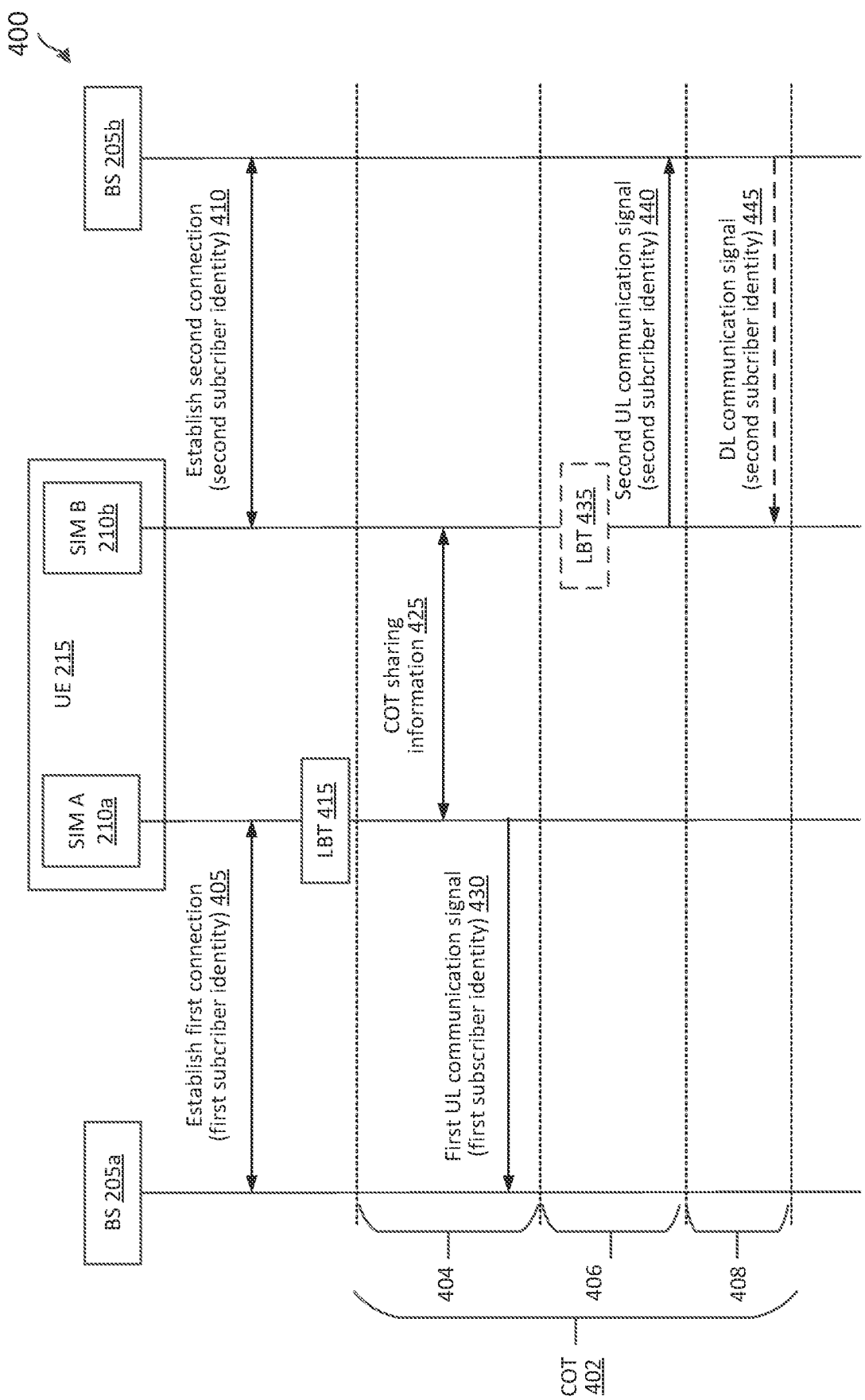
FIG. 4 a sequence diagram of a communication method utilizing multiple subscriptions according to some aspects of the present disclosure.

FIG. 4 is a sequence diagram of a communication method 400 that utilizes multiple subscriptions according to some aspects of the present disclosure. The method 400 may be implemented between a MultiSim UE (e.g., the UEs 115 and/or 215) and one or more corresponding BSs (e.g., the BSs 105 and/or 205). For example, the method 400 is implemented by the UE 215 (having a SIM A 210*a* and a SIM B 210*b*) and the BSs 205*a* and 205*b* of FIG. 2A. The method 400 may employ similar mechanisms as discussed above in relation to FIGS. 1, 2A-2B, and 3. In some aspects, the UE 215 may utilize one or more components, such as the processor 602, the memory 604, the MultiSim module 608, the MultiSim COT sharing module 609, the transceiver 610, the modem 612, and the one or more antennas 616 of FIG. 6, to execute the steps of method 400. In some aspects, each of the BS 205*a*, 205*b* may utilize one or more components, such as the processor 502, the memory 504, the communication module 508, the transceiver 510, the modem 512, and the one or more antennas 516 of FIG. 5, to execute the steps of method 400. As illustrated, the method 400 includes a number of enumerated actions, but aspects of the method 400 may include additional actions before, after, and in between the enumerated actions. In some aspects, one or more of the enumerated actions may be omitted or performed in a different order.

Generally speaking, the method 400 includes features similar to method 300 in many respects. For example, the UE 215 may have a first subscriber identity for a first subscription with a first operator (e.g., operating the BS 205*a*) and a second subscriber identity for a second subscription with a second operator (e.g., operating the BS 205*b*), and may utilize the SIM A 210*a* and the SIM B 210*b* for the first subscription and the second subscription, respectively. Further, actions 405, 410, 425, 430, 435, 440, 445 are similar to actions 305, 310, 325, 330, 335, 340, 345, respectively. Accordingly, for sake of brevity, details of those actions will not be repeated here.

In the method 400, the UE 215 may perform COT sharing between the SIM A 210*a* and the SIM B 210*b* using substantially similar mechanisms as in the method 300. However, the UE 215 may initiate a COT and share the COT between the two subscriptions, instead of sharing a COT of the serving BS 205*a* of the first subscription as in the method 300.

For instance, at action 405, the UE 215 establishes a first connection with the BS 205*a* via the SIM A 210*a* based on the first subscriber identity, for example, using similar mechanisms as discussed above at action 305.

At action 410, the UE 215 establishes a second connection with the BS 205*b* via the SIM B 210*b* based on the second subscriber identity, for example, using similar mechanisms as discussed above at action 310.

In an aspect, the UE 215 may have data associated with the first subscription or first subscriber identity ready for transmission to the BS 205*a*. Thus, at action 415, the UE 215 performs an LBT (e.g., a CAT4 LBT) to contend for a COT 402 in the unlicensed band. The LBT may be successful indicating the channel is clear for transmission. At action 430, the UE 215 transmits, and the BS 205*a* receives, a first UL communication signal, for example, using similar mechanisms as discussed above at action 330. For example, the UE 215 may transmit the first UL communication signal over the first connection (established between the SIM A 210*a* and the BS 205*a* at action 405 using the first subscriber identity). The first UL communication signal may include PUCCH UCI, PUSCH data, and/or UL reference signal(s) associated with the first subscriber identity.

The UE 215 may determine to share the COT 402 between the SIM A 210*a* and the SIM B 210*b*. Thus, at action 425, the SIM A 210*a* and the SIM B 210*b* exchanges COT sharing information, for example, using similar mechanisms as discussed above at action 325. The COT sharing information may include timing information (e.g., a COT start time, a duration, and/or a COT end time) associated with the COT 402, and/or CAPC.

At action 440, the UE 215 transmits via the SIM B 210*b*, and the BS 205*b* receives, a second UL communication signal over the second connection (established between the SIM B 210*b* and the BS 205*b* at action 310 using the second subscriber identity) during the shared second portion 406, for example, using similar mechanisms as discussed above at action 340. Further, in some aspects, the UE 215 may perform an LBT (e.g., a CAT2 LBT) at action 435 prior to transmitting the second UL communication signal at action 440, for example, when the gap between the first UL communication signal and the second UL communication signal is greater than a certain threshold (e.g., greater than 16 μs). In other aspects, the UE 215 may skip performing the LBT at action 435, for example, when the gap between the first UL communication signal and the second UL communication signal is less than the threshold or when there is no gap between the first UL communication signal and the second UL communication signal.

In an aspect, the SIM B 210*b* may not utilize the entire remaining portion of the COT 302 after the first portion 404. As shown, there is a third portion 408 remaining in the COT 402 after the second UL communication signal. The SIM B 210*b* may determine to share the remaining third portion 408 of the COT 402 with its serving BS 205*b*. For instance, the SIM B 210*b* may include information for sharing the third portion 408 of the COT 402 in the second UL communication signal transmitted at action 440. Accordingly, at action 445, the BS 205*b* transmits, and the UE 215 receives a DL communication signal over the second connection based on the second subscriber identity during the third portion 408, for example, using similar mechanisms as discussed above at action 345. The DL communication signal may include PDCCH DCI, PDSCH data, and/or DL reference signal(s).

In some aspects, when the UE 215 shares a COT (e.g., the COTs 240, 302, 402) between the SIM A 210*a* and the SIM B 210*b* using the method 300 or 400, the UE 215 may configure one of the SIM A 210a or the SIM B 210b to be in a sleep mode while the other one of the SIM A 210a or SIM B 210b is transmitting in the COT. For example, when the SIM A 210a is transmitting in the COT (e.g., during the portion 304 of the COT 302 in the method 300 or the portion 404 of the COT 402 in the method 400), the UE 215 may configure the SIM B 210b to operate in a sleep mode if a UL slot associated with the first subscription collides with a DL slot associated with the second subscription. As discussed above, communications for the first subscription 212a may be based on a first TDD pattern configured by the BS 205a, and communications via the SIM B 210a may be based on a second TDD pattern configured by the BS 205b. Each of the first and second TDD patterns may include one or more UL slots and/or one or more DL slots. In some instances, a UL slot in the first TDD pattern may collide (e.g., at least partially overlaps) with a DL slot in the second TDD pattern or vice versa. In some aspects, the SIM B 210b may not monitor for paging messages during paging instances (in DL slot(s)) configured by the BS 205b if the DL slot(s) collide with UL slot(s) of the first subscription. In some aspects, the SIM B 210b may not wake up during an active period (in DL slot(s)) during a CDRX cycle configured by the BS 205b if the DL slot(s) collide with UL slot(s) of the first subscription. In some aspects, the SIM B 210b may not perform clear channel assessment (CCA) or LBT when the SIM A 210a is transmitting in a COT.

Figure 5:
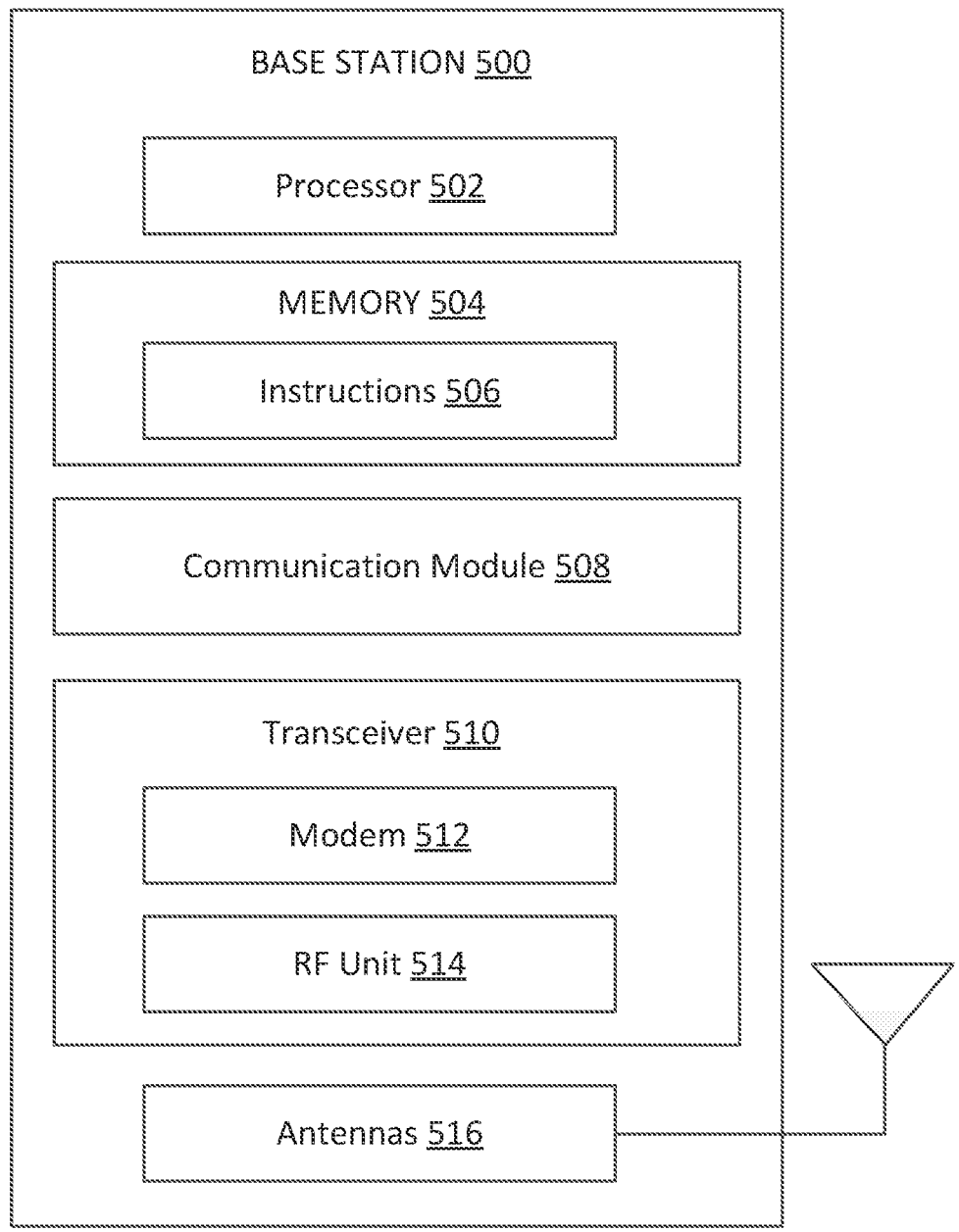
FIG. 5 illustrates a block diagram of a base station (BS) according to some aspects of the present disclosure.

FIG. 5 is a block diagram of an exemplary BS 500 according to some aspects of the present disclosure. The BS 500 may be a BS 105 or a BS 205 as discussed in FIGS. 1, 2A-2B, and 3-4. As shown, the BS 500 may include a processor 502, a memory 504, a communication module 508, a transceiver 510 including a modem subsystem 512 and a RF unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1, 2A-2B, and 3-4. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 508 may be implemented via hardware, software, or combinations thereof. For example, the communication module 508 may be implemented as a processor, circuit, and/or instructions 506 stored in the memory 504 and executed by the processor 502. In some examples, the communication module 508 can be integrated within the modem subsystem 512. For example, the communication module 508 can be implemented by a combination of software components (e.g., executed by a DSP or a general processor) and hardware components (e.g., logic gates and circuitry) within the modem subsystem 512. The communication module 508 may communicate with one or more components of BS 500 to implement various aspects of the present disclosure, for example, aspects of FIGS. 1, 2A-2B, and 3-4.

In some aspects, the communication module 508 is configured to contend for a COT in a shared channel (e.g., an unlicensed band) by performing an LBT and transmit a DL communication signal to a UE (e.g., the UEs 115, 215, and/or 600) during the COT upon a successful LBT. The communication module 508 is further configured to transmit a COT indication signal to indicate a successful acquisition of the COT and/or COT timing information (e.g., a COT start time, a COT end time, and/or a COT duration) and/or a channel access priority or a data priority for which the UE may share the COT for communication. In some aspects, the communication module 508 is further configured to receive a COT indication or COT sharing information related to a UE initiated COT for which the BS 500 is allowed to share and transmit a DL communication in a shared portion of the COT.

As shown, the transceiver 510 may include the modem subsystem 512 and the RF unit 514. The transceiver 510 can be configured to communicate bi-directionally with other devices, such as the UEs 115 and/or BS 500 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., RRC configurations, MIB, SIB, PDSCH data and/or PDCCH DCIs, COT indication, COT sharing information, etc.) from the modem subsystem 512 (on outbound transmissions) or of transmissions originating from another source such as a UE 115, 215, and/or UE 500. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 500 to enable the BS 500 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The transceiver 510 may provide the demodulated and decoded data (e.g., PUSCH data, PUCCH UCI, MSG1, MSG3, COT indication, COT sharing information, etc.) to the communication module 508 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

FIG. 6 is a block diagram of an exemplary UE 600 according to some aspects of the present disclosure. The UE 600 may be a UE 115 or UE 215 as discussed above in FIGS. 1, 2A-2B, and 3-4. As shown, the UE 600 may include a processor 602, a memory 604, a MultiSim module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to a UE 115 or an anchor in connection with aspects of the present disclosure, for example, aspects of FIGS. 1, 2A-2B, 3-4, and 7. Instructions 606 may also be referred to as code, which may be interpreted broadly to include any type of computer-readable statement(s) as discussed above with respect to FIG. 5.

Each of the MultiSim module 608 and MultiSim COT sharing module 609 may be implemented via hardware, software, or combinations thereof. For example, each of the MultiSim module 608 and MultiSim COT sharing module 609 may be implemented as a processor, circuit, and/or instructions 606 stored in the memory 604 and executed by the processor 602. In some aspects, the MultiSim COT sharing module 609 can be integrated within the modem subsystem 612. For example, the MultiSim COT sharing module 609 can be implemented by a combination of software components (e.g., executed by a DSP or a general processor) and hardware components (e.g., logic gates and circuitry) within the modem subsystem 612. The MultiSim module 608 and/or the MultiSim COT sharing module 609 may communicate with each other and with one or more components of UE 600 to implement various aspects of the present disclosure, for example, aspects of FIGS. 1, 2A-2B, 3-4, and 7.

In some aspects, the MultiSim module 608 may include multiple SIMs or SIM cards (e.g., 2, 3, 4, or more) similar to the SIMs 210. Each SIM may be configured to store information used for accessing a network, for example, to authenticate and identify the UE 600 as a subscriber of the network. Some examples of information stored on a SIM may include, but not limited to, a subscriber identity such as an international mobile subscriber identity (IMSI) and/or information and/or key used to identify and authenticate the UE 600 in a certain provider network. In some aspects, the UE 600 may have a first subscription on a first SIM of the multiple SIMs and a second subscription on a second SIM of the multiple SIMs. The first subscription may identify the UE 600 by a first subscriber identity, and the second subscription may identify the UE 600 by a second subscriber identity.

In some aspects, the MultiSim COT sharing module 609 is configured to coordinate with the MultiSim module 608 to transmit a first communication signal based on the first subscriber identity during a first portion of a COT and transmit a second communication signal based on the second subscriber identity during a second portion of the COT. The second subscriber identity is different from the first subscriber identity. Further, as part of transmitting the second communication signal, the MultiSim COT sharing module 609 is configured to transmit the second communication signal using the second portion of the COT based on COT sharing information (e.g., a COT start time, a COT end time, and/or a COT duration, CAPC) associated with sharing the second portion of the COT as discussed above with reference to FIGS. 2A-2B and 3-4.

As shown, the transceiver 610 may include the modem subsystem 612 and the RF unit 614. The transceiver 610 can be configured to communicate bi-directionally with other devices, such as the BSs 105 and 500. The modem subsystem 612 may be configured to modulate and/or encode the data from the memory 604, the MultiSim module 608 and/or the MultiSim COT sharing module 609 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUSCH data, PUCCH UCI, MSG1, MSG3, COT indication, COT sharing information, etc.) or of transmissions originating from another source such as a UE 115, a BS 105, or an anchor. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 600 to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., RRC configurations, MIB, SIB, PDSCH data and/or PDCCH DCIs, COT indication, COT sharing information, etc.) to the MultiSim module 608 and/or the MultiSim COT sharing module 609 for processing. The antennas 616 may include multiple antennas of similar or different designs in order to sustain multiple transmission links.

In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Further, in some aspects, the transceiver 610 is configured to coordinate with components of the UE 600 to transmit a first communication signal based on the first subscriber identity during a first portion of a COT and transmit a second communication signal based on the second subscriber identity during a second portion of the COT, where the first subscriber identity is different form the second subscriber identity.

Figure 7:
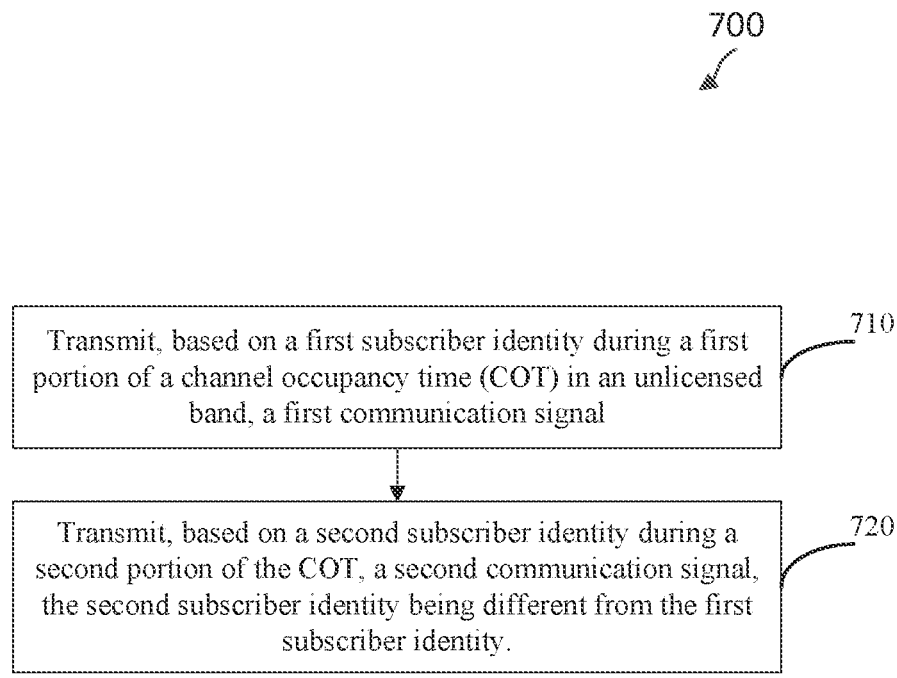
FIG. 7 is a flow diagram of a wireless communication method according to some aspects of the present disclosure.

FIG. 7 is a flow diagram illustrating a wireless communication method 700 according to some aspects of the present disclosure. Aspects of the method 700 can be executed by a computing device (e.g., a processor, processing circuit, and/or other suitable component) of a wireless communication device or other suitable means for performing the blocks. In one aspect, a wireless communication device, such as a UE 115, 215, or 600, may utilize one or more components, such as the processor 602, the memory 604, the MultiSim module 608, the MultiSim COT sharing module 609, the transceiver 610, the modem 612, the RF unit 614, and the one or more antennas 616, to execute the blocks of method 700. The method 700 may employ similar mechanisms as described in FIGS. 1, 2A-2B, and 3-4. As illustrated, the method 700 includes a number of enumerated blocks, but aspects of the method 700 may include additional blocks before, after, and in between the enumerated blocks. In some aspects, one or more of the enumerated blocks may be omitted or performed in a different order.

At block 710, a UE (e.g., the UE 115, 215, and/or 600) transmits, based on a first subscriber identity during a first portion of a COT (e.g., the COTs 240, 302, and/or 402) in an unlicensed band, a first communication signal. For instance, the UE may transmit the first communication signal over a connection established based on the first subscriber identity as described above with reference to FIGS. 2B, 3, and 4. The first subscriber identity may identify a first subscription of the UE with a first operator. For example, the first subscriber identity may be an IMSI. In some aspects, means for performing the functionality of block 710 can, but not necessarily, include, for example, MultiSim module 608, MultiSim COT sharing module 609, transceiver 610, antennas 616, processor 602, and/or memory 604 with reference to FIG. 6.

At block 720, the UE transmits, based on a second subscriber identity during a second portion of the COT, a second communication signal, the second subscriber identity being different from the first subscriber identity. For instance, the UE may transmit the second communication signal over a connection established based on the second subscriber identity as described above with reference to FIGS. 2B, 3, and 4. The second subscriber identity may identify a second subscription of the UE with a second operator. For example, the second subscriber identity may be an IMSI. In some aspects, the second operator may be the same as the first operator. In other aspects, the second operator may be different from the first operator. In some aspects, means for performing the functionality of block 720 can, but not necessarily, include, for example, MultiSim module 608, MultiSim COT sharing module 609, transceiver 610, antennas 616, processor 602, and/or memory 604 with reference to FIG. 6.

In some aspects, as part of transmitting the second communication signal at block 720, the UE may transmit, the second communication signal based on information for sharing the second portion of the COT. Further, in some aspects, the information for sharing the second portion of the COT comprises at least one of timing information (e.g., a COT start time, a duration, and/or a COT end time) associated with the COT or a channel access priority class. Further, in some aspects, a first SIM associated with the first subscriber identity may communicate, with a second SIM associated with the second subscriber identity, the information for sharing the second portion of the COT.

In some aspects, the UE further receives, from a BS (e.g., the BSs 105, 205, and/or 500) based on the first subscriber identity, an indication of the COT. For instance, the COT may be initiated by the BS as discussed above with reference to FIG. 3. Further, in some aspects, as part of transmitting the second communication signal at block 720, the UE may transmit, during a slot within the second portion of the COT based on the slot being a common uplink slot for the first subscriber identity and the second subscriber identity, the second communication signal. In other aspects, the UE may perform an LBT to initiate the COT when the UE has data associated with the first subscriber identity for transmission and may transmit the first communication signal carrying the data at block 710.

In some aspects, as part of transmitting the second communication signal at block 720, the UE may transmit the second communication signal further based on a channel access priority associated with the second communication signal. For instance, the second communication signal (transmitted based on the second subscriber identity) may be associated with a higher channel access priority than the first communication signal (transmitted based on the first subscriber identity).

In some aspects, as part of transmitting the second communication signal at block 720, the UE may transmit the second communication signal further based on a logical channel priority (e.g., a data priority or traffic priority) associated with the second communication signal. For instance, the second communication signal (transmitted based on the second subscriber identity) may be associated with a higher logical channel priority than the first communication signal (transmitted based on the first subscriber identity).

In some aspects, the COT used for transmitting the first communication signal at block 710 and the second communication signal at block 720 is associated with the first subscriber identity. That is, the COT is initiated by the UE for a transmission (the first communication signal) associated with the first subscriber identity or initiated by a first BS (e.g., the BS 205*a*) serving the UE based on the first subscriber identity. Further, the UE may receive, from a second BS (e.g., the BS 205*b*) based on the second subscriber identity during a third portion of the COT after the second portion, a third communication signal. That is, the COT associated with the first subscriber identity is shared with the second BS serving the UE based on the second subscriber identity. In some aspects, as part of transmitting the second communication signal at block 720, the UE may transmit, to the second BS based on the second subscriber identity, the second communication signal comprising information for sharing the third portion of the COT.

In some aspects, the UE further operates in a sleep mode associated with the second subscriber identity during the first portion of the COT (while the UE transmits the first communication signal based on the first subscriber identity). For instance, the UE may operate in the sleep mode by refraining from performing paging, wake-up operations associated with a CDRX cycle, CCA during the first portion of the COT. In some instances, if the UE is a DSDA device, the UE may further configure at least one of an RF component at an RF frontend (e.g., the RF unit 614) or a component at a baseband unit (e.g., the transceiver 610) of the UE used for the second subscription to operate in a sleep mode or at least at a lower power mode.

In some aspects, the UE further performs, during the COT, an LBT and may transmit the second communication signal at block 720 upon passing the LBT (indicating the unlicensed band is clear for transmission). In some aspects, the UE may perform the LBT based on a first contention window size (CWS) smaller than a second CWS. In other aspects, as part of transmitting the second communication signal at block 720, the UE may transmit the second communication signal without performing an LBT.

Further aspects of the present disclosure include the following:

1. A method of wireless communication performed by a user equipment (UE), the method comprising:
    transmitting, based on a first subscriber identity during a first portion of a channel occupancy time (COT) in an unlicensed band, a first communication signal; and
    transmitting, based on a second subscriber identity during a second portion of the COT, a second communication signal, the second subscriber identity being different from the first subscriber identity.
2. The method of aspect 1, wherein the transmitting the second communication signal comprises:
    transmitting, the second communication signal based on information for sharing the second portion of the COT.
3. The method of aspect 2, wherein the information for sharing the second portion of the COT comprises at least one of timing information associated with the COT or a channel access priority class.
4. The method of any of aspects 1-3, further comprising:
    communicating, by a first subscriber identity module (SIM) associated with the first subscriber identity with a second SIM associated with the second subscriber identity, the information for sharing the second portion of the COT.
5. The method of any of aspects 1-4, further comprising:
    receiving, from a base station (BS) based on the first subscriber identity, an indication of the COT.
6. The method of any of aspects 1-5, wherein the transmitting the second communication signal comprises:
    transmitting, during a slot within the second portion of the COT based on the slot being a common uplink slot for the first subscriber identity and the second subscriber identity, the second communication signal.
7. The method of any of aspects 1-3, further comprising:
    performing a listen-before-talk (LBT) to initiate the COT.
8. The method of any of aspects 1-7, wherein the transmitting the second communication signal comprises:
    transmitting the second communication signal further based on a channel access priority associated with the second communication signal.
9. The method of any of aspects 1-8, wherein the transmitting the second communication signal comprises:
    transmitting the second communication signal further based on a logical channel priority associated with the second communication signal.
10. The method of any of aspects 1-9, wherein:
    the COT is associated with the first subscriber identity; and
    the method further comprises:
    receiving, from a base station (BS) based on the second subscriber identity during a third portion of the COT after the second portion, a third communication signal.
11. The method of aspect 10, wherein the transmitting the second communication signal comprises:
    transmitting, to the BS based on the second subscriber identity, the second communication signal comprising information for sharing the third portion of the COT.
12. The method of any of aspects 1-11, further comprising:
    operating in a sleep mode associated with the second subscriber identity during the first portion of the COT.
13. The method of any of aspects 1-11, further comprising:
    performing, during the COT, a listen-before-talk (LBT),
    wherein the transmitting the second communication signal is based on the LBT.
14. The method of aspect 13, wherein the performing the LBT comprises:
    performing the LBT based on a first contention window size (CWS) smaller than a second CWS.
15. The method of any of aspects 1-12, wherein the transmitting the second communication signal comprises:
    transmitting the second communication signal without performing a listen-before-talk (LBT).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    performing a listen-before-talk (LBT) procedure to initiate a channel occupancy time in an unlicensed band, the COT being associated with a first subscriber identity;
    transmitting, based on the first subscriber identity during a first time duration of the COT, a first communication signal;
    communicating, by a first subscriber identity module (SIM) disposed in the UE, information with a second SIM disposed in the UE, the information being for sharing a second time duration of the COT; and
    transmitting, by the UE based on the information for sharing the second time duration of the COT and based on a second subscriber identity during the second time duration of the COT, a second communication signal, the second subscriber identity being different from the first subscriber identity.

2. The method of claim 1, wherein the transmitting the second communication signal comprises:
    transmitting the second communication signal based on the information for sharing the second time duration of the COT.

3. The method of claim 2, wherein the information for sharing the second time duration of the COT comprises at least one of timing information associated with the COT or a channel access priority class associated with the second communication signal.

4. The method of claim 1, further comprising:
    receiving, from a base station (BS) based on the first subscriber identity, an indication of the COT.

5. The method of claim 1, wherein the transmitting the second communication signal comprises:
    transmitting, during a slot within the second time duration of the COT based on the slot being a common uplink slot for the first subscriber identity and the second subscriber identity, the second communication signal.

6. The method of claim 1, wherein the transmitting the second communication signal comprises:
    transmitting the second communication signal further based on a logical channel priority associated with the second communication signal.

7. The method of claim 1, wherein:
    the COT is associated with the first subscriber identity; and
    the method further comprises:
        receiving, from a base station (BS) based on the second subscriber identity during a third time duration of the COT after the second time duration, a third communication signal.

8. The method of claim 7, wherein the transmitting the second communication signal comprises:
    transmitting, to the BS based on the second subscriber identity, the second communication signal comprising information for sharing the third time duration of the COT.

9. The method of claim 1, further comprising:
    operating in a sleep mode associated with the second subscriber identity during the first time duration of the COT.

10. The method of claim 1,
    wherein the transmitting the second communication signal is based on the LBT procedure being successful.

11. The method of claim 10, wherein the performing the LBT procedure comprises:
    performing the LBT procedure based on a first contention window size (CWS) being smaller than a second CWS.

12. The method of claim 1, wherein the transmitting the second communication signal comprises:
    transmitting the second communication signal without performing an additional LBT procedure.

13. A user equipment (UE) comprising:
    a transceiver; and
    a processor in communication with the transceiver, wherein the UE is configured to:
        perform a listen-before-talk (LBT) procedure to initiate a channel occupancy time in an unlicensed band, the COT being associated with a first subscriber identity;
        transmit, based on the first subscriber identity during a first time duration of the COT, a first communication signal;
        communicate, by a first subscriber identity module (SIM) disposed in the UE, information with a second SIM disposed in the UE, the information being for sharing a second time duration of the COT; and
        transmit, based on the information for sharing the second time duration of the COT and based on a second subscriber identity during the second time duration of the COT, a second communication signal, the second subscriber identity being different from the first subscriber identity.

14. The UE of claim 13, wherein the transceiver configured to transmit the second communication signal is configured to:
    transmit, the second communication signal based on the information for sharing the second time duration of the COT, wherein the information for sharing the second time duration of the COT comprises at least one of timing information associated with the COT or a channel access priority class associated with the second communication signal.

15. The UE of claim 13, wherein the transceiver is further configured to:
receive, from a base station (BS) based on the first subscriber identity, an indication of the COT.

16. The UE of claim 13, wherein the transceiver is further configured to transmit the second communication signal is configured to:
transmit, during a slot within the second time duration of the COT based on the slot being a common uplink slot for the first subscriber identity and the second subscriber identity, the second communication signal.

17. The UE of claim 13, wherein the transceiver configured to transmit the second communication signal is configured to:
transmit the second communication signal further based on at least one of a channel access priority or a logical channel priority associated with the second communication signal.

18. The UE of claim 13, wherein:
the COT is associated with the first subscriber identity; and
the transceiver is further configured to:
receive, from a base station (BS) based on the second subscriber identity during a third time duration of the COT after the second time duration, a third communication signal.

19. The UE of claim 18, wherein the transceiver configured to transmit the second communication signal is configured to:
transmit, to the BS based on the second subscriber identity, the second communication signal comprising information for sharing the third time duration of the COT.

20. The UE of claim 13, further comprising:
a processor configured to operate in a sleep mode associated with the second subscriber identity during the first time duration of the COT.

21. The UE of claim 13,
wherein the transceiver configured to transmitting the second communication signal is configured to:
transmit the second communication signal based on the LBT procedure being successful.

22. A non-transitory computer-readable medium having program code recorded thereon for wireless communication by a user equipment (UE), the program code comprising:
code for causing the UE to perform a listen-before-talk (LBT) procedure to initiate a channel occupancy time in an unlicensed band, the COT being associated with a first subscriber identity;
code for causing the UE to transmit, based on the first subscriber identity during a first time duration of the COT, a first communication signal;
code for causing the UE to communicate, by a first subscriber identity module (SIM) disposed in the UE, information with a second SIM disposed in the UE, the information being for sharing a second time duration of the COT; and
code for causing the UE to transmit, based on the information for sharing the second time duration of the COT and based on a second subscriber identity during the second time duration of the COT, a second communication signal, the second subscriber identity being different from the first subscriber identity.

23. The non-transitory computer-readable medium of claim 22, wherein the code for causing the UE to transmit the second communication signal is configured to:
transmit, the second communication signal based on the information for sharing the second time duration of the COT.

24. A user equipment (UE) comprising:
means for performing a listen-before-talk (LBT) procedure to initiate a channel occupancy time in an unlicensed band, the COT being associated with a first subscriber identity;
means for transmitting, based on the first subscriber identity during a first time duration of the COT, a first communication signal;
means for communicating, by a first subscriber identity module (SIM) disposed in the UE, information with a second SIM disposed in the UE, the information being for sharing a second time duration of the COT; and
means for transmitting, by the UE based on the information for sharing the second time duration of the COT and based on a second subscriber identity during the second time duration of the COT, a second communication signal, the second subscriber identity being different from the first subscriber identity.

25. The UE of claim 24, wherein the means for transmitting the second communication signal is configured to:
transmit, the second communication signal based on the information for sharing the second time duration of the COT.

* * * * *